No. 776,099. PATENTED NOV. 29, 1904.
S. WHINERY.
APPARATUS FOR HEATING ASPHALT PAVING MATERIAL, &c.
APPLICATION FILED APR. 22, 1904.
NO MODEL.
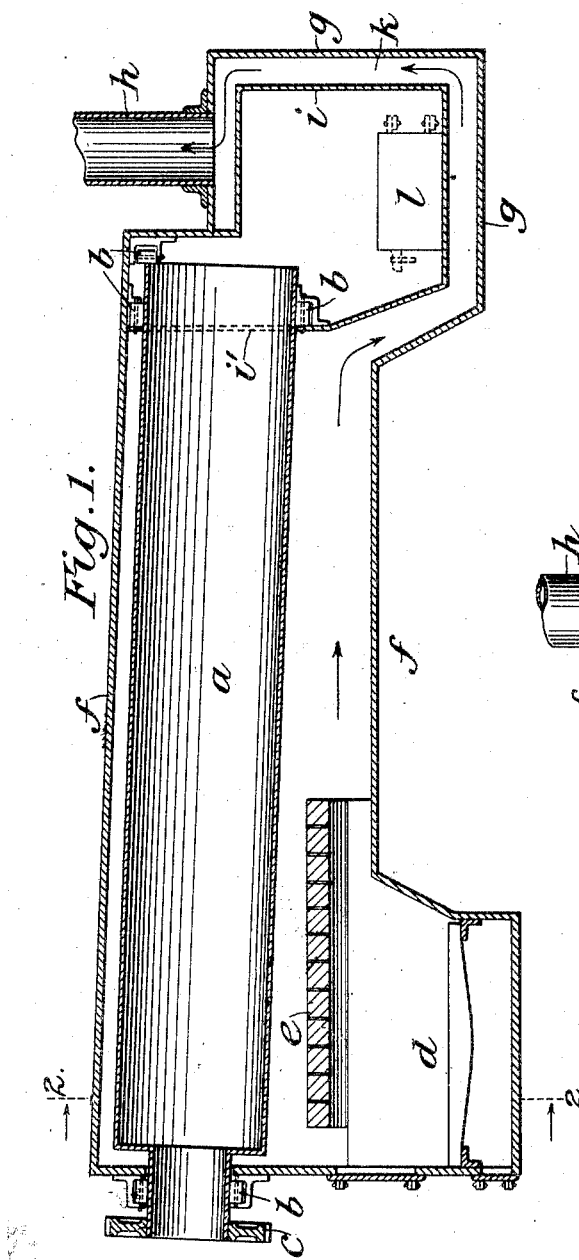
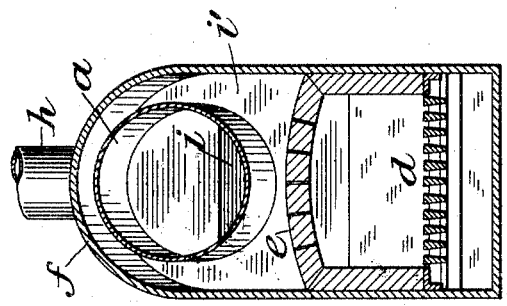
Witnesses:
Chas. D. King
A. N. Jesbera
Inventor:
Samuel Whinery
by Redding, Kiddle & Greeley
Attys.

No. 776,099. Patented November 29, 1904.

UNITED STATES PATENT OFFICE.

SAMUEL WHINERY, OF EAST ORANGE, NEW JERSEY.

APPARATUS FOR HEATING ASPHALT PAVING MATERIAL, &c.

SPECIFICATION forming part of Letters Patent No. 776,099, dated November 29, 1904.

Application filed April 22, 1904. Serial No. 204,329. (No model.)

*To all whom it may concern:*

Be it known that I, SAMUEL WHINERY, a citizen of the United States, residing at East Orange, in the State of New Jersey, have invented certain new and useful Improvements in Apparatus for Heating Asphalt Paving Material, &c., of which the following is a specification, reference being had to the accompanying drawings, forming a part hereof.

This invention relates particularly to apparatus for heating previously-prepared asphalt paving material or other materials for purposes of repair or other purposes which require a quantity of material considerably less than that which measures the capacity of the plant employed in the original preparation of the material. For such purposes only it is obvious that the plant for the original preparation of the material cannot be operated economically. It is usual, therefore, to store a quantity of the prepared material, which can be drawn upon as required and reheated for immediate use. This reheating is commonly carried on in shallow pans or kettles over a fire. Constant stirring of the material while it is being reheated and so long as any material remains in the pan or kettle is necessary in order to prevent burning of the material; but even then it frequently happens that the material is burned more or less, with the result that the material becomes wholly useless for the intended purpose or that the work done with it is of an inferior character. It is to be noted also that great care is required to maintain the material in the pan at the proper temperature and condition while any portion of it is allowed to remain in the pan and that constant stirring is required. The forms of apparatus sometimes employed in the original preparation of the material are not available for the particular purposes herein referred to, for the reason that they are designed and constructed with a view to the immediate and continuous disposition or removal of the material as fast as it is brought to the proper consistency, whereas in the uses to which reference is made herein it is desirable to provide for the maintenance of a greater or less quantity in proper condition for use in order that the progress of the work being done shall not be delayed by lack of material at any time, while no material which has been reheated shall be permitted to cool and become useless until again reheated.

It is therefore the object of the present invention to produce an apparatus which shall answer all the requirements of repair work or other work of similar character, providing not only for the reheating of the material, but for the maintenance under proper conditions of a sufficient quantity to meet the exigencies of the work being done, while at the same time the exercise of no special attention shall be required.

In accordance with the invention there is provided for coöperation with the reheating means a storage-chamber which receives the reheated material and is so located with respect to the reheating means and the source of heat that the material therein shall be maintained in the proper condition without danger of burning.

The invention will be more fully explained hereinafter with reference to the accompanying drawings, in which it is illustrated as embodied in a convenient and practical form.

In said drawings, Figure 1 is a view in longitudinal vertical section of so much of a complete apparatus as is necessary to enable the invention to be understood, and Fig. 2 is a transverse section on the plane indicated by the line 2 2 of Fig. 1.

The particular character of the means for reheating the material may be varied more or less, as desired; but it is preferable to employ a rotating drum $a$, which may be open at its ends, mounted for rotation upon suitable supports, as at $b$, arranged to be rotated by any convenient means, as indicated by the gear $c$, and inclined at such an angle as to cause the material which is fed in cold at its upper end to traverse the drum slowly and be discharged at the lower end. Beneath the forward or upper end of the drum is located a suitable fire-box $d$, above which may be constructed a perforated screen $e$ for the purpose of better distributing the heat and of protecting from too great heat that portion of the drum immediately above the fire-box. As will be readily understood, the material which is fed in cold at the upper or forward end of the drum $a$ is gradually heated in its progress through the drum, as described, being tumbled about and thoroughly stirred and prevented from remaining in contact with the hot shell of the drum in one place long enough to be burned.

The drum $a$ is preferably completely inclosed within the shell $f$, which also includes the fire-box, so that no heat may be wasted. At the farther end, remote from the fire-box, the shell is extended, as at $g$, and may be provided with a suitable stack $h$ to carry off the products of combustion. Within the extension $g$ of the shell is formed a chamber $i$, arranged to receive the reheated material as it is discharged from the drum $a$. This chamber is shut off from communication with the fire-box, the end of the drum $a$ being extended through the wall $i'$ of the inner chamber, such wall fitting closely enough about the drum to exclude the products of combustion. Between the wall of the inner chamber $i$ and the wall of the extension $g$ is formed a channel or passage $k$ for the products of combustion from the fire-box $d$ to the stack $h$, such channel or passage being preferably formed on all sides of the inner chamber $i$ to protect it from contact with the external air. One or more doors, as at $l$, may be provided through the shell $g$ and the wall of the chamber $i$ to permit of the removal of the reheated material from the chamber $i$, as may be required.

The chamber $i$, as will be observed, is of such capacity as to contain a sufficient quantity of the reheated material to serve for the work to be done and so that it may be removed as required for the work or permitted to accumulate when no material is required without necessitating the cessation of the reheating. This quantity of material, moreover, will be maintained in proper condition for the work to be done. As the chamber $i$ is out of contact with the external air and is surrounded by the products of combustion from the fire-box, the material therein cannot become cool and hard. On the other hand, as the chamber $i$ is located at a point remote from the products of combustion the heat about the same will not be so great as to cause the material therein to burn even though it be not stirred. The apparatus therefore requires no further attention than is necessary to provide for the rotation of the drum $a$ and for the maintenance of sufficient fire beneath the same to properly reheat the material which is fed into the drum.

I claim as my invention—

1. In an apparatus for heating asphalt paving material, &c., the combination with a rotating drum and inclosing shell and a fire-box within the shell, of a chamber to receive the heated material from the drum and an extension of said shell about said chamber forming a channel or passage for the products of combustion about said chamber, substantially as described.

2. In an apparatus for heating asphalt paving material, &c., the combination of a rotating drum, a shell inclosing the same and a fire-box located in said shell, of a chamber arranged to receive the material from the drum, said drum being extended through the wall of said chamber, and an extension of said shell about said chamber, forming a channel or passage on all sides of said chamber for the products of combustion from the fire-box, substantially as described.

This specification signed and witnessed this 20th day of April, A. D. 1904.

SAMUEL WHINERY.

In presence of—
ALBERT A. CARY,
H. A. SCHMID.